US012736912B2

(12) United States Patent
Ando

(10) Patent No.: US 12,736,912 B2

(45) Date of Patent: Sep. 15, 2026

(54) IMAGE FORMING APPARATUS THAT INCLUDES MOVABLE UNIT SUPPORTING TRANSFER MEMBER TO WHICH TRANSFER VOLTAGE IS APPLIED

(71) Applicant: KYOCERA Document Solutions Inc., Osaka (JP)

(72) Inventor: Satoshi Ando, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/171,843

(22) Filed: Apr. 7, 2025

(65) Prior Publication Data

US 2025/0334922 A1 Oct. 30, 2025

(30) Foreign Application Priority Data

Apr. 25, 2024 (JP) ................................ 2024-071218

(51) Int. Cl.

*G03G 21/16* (2006.01)
*G03G 15/00* (2006.01)
*G03G 15/16* (2006.01)

(52) U.S. Cl.

CPC ..... *G03G 21/1652* (2013.01); *G03G 15/1605* (2013.01); *G03G 15/1665* (2013.01); *G03G 15/6558* (2013.01); *G03G 21/1633* (2013.01); *G03G 21/1647* (2013.01); *G03G 2215/00409* (2013.01); *G03G 2221/1642* (2013.01); *G03G 2221/1654* (2013.01); *G03G 2221/166* (2013.01)

(58) Field of Classification Search

CPC ........... G03G 15/1605; G03G 15/1665; G03G 15/1675; G03G 15/6558; G03G 21/1633; G03G 21/1652; G03G 21/168; G03G 2215/00409; G03G 2215/00544; G03G 2215/1642; G03G 2215/1654; G03G 2215/166

See application file for complete search history.

(56) References Cited

U.S. PATENT DOCUMENTS

2012/0099896 A1* 4/2012 Kamano ........... G03G 21/1633 399/121
2019/0064728 A1* 2/2019 Shima .................. G03G 21/168

FOREIGN PATENT DOCUMENTS

JP H07077921 A 3/1995

* cited by examiner

*Primary Examiner* — Sophia S Chen

(74) *Attorney, Agent, or Firm* — Alleman Hall LLP

(57) ABSTRACT

A transfer member is supported by a movable unit. A blocking member is movable between a blocking position at which an access path to a first terminal is blocked and an opening position at which the access path is opened. A second terminal is supported by the movable unit. Following movement of the movable unit, a latch mechanism latches the blocking member at the blocking position when the movable unit is located at a separated position and unlatches the blocking member when the movable unit moves from the separated position to a standard position. When the movable unit moves from the separated position to the standard position, the second terminal moves to a position at which the second terminal comes into contact with the first terminal through the access path.

5 Claims, 7 Drawing Sheets

IMAGE FORMING APPARATUS THAT INCLUDES MOVABLE UNIT SUPPORTING TRANSFER MEMBER TO WHICH TRANSFER VOLTAGE IS APPLIED

INCORPORATION BY REFERENCE

This application is based upon and claims the benefit of priority from the corresponding Japanese Patent Application No. 2024-071218 filed on Apr. 25, 2024, the entire contents of which are incorporated herein by reference.

BACKGROUND

This disclosure relates to an image forming apparatus including a movable unit that supports a transfer member to which a transfer voltage is applied.

In an electrophotographic image forming apparatus, a transfer device transfers a toner image to a sheet from an image-carrying member that carries the toner image. The transfer device includes a transfer member to which a transfer voltage is applied. The transfer member causes the toner image to transition from the image-carrying member to the sheet by using an electric field caused by the transfer voltage.

A mechanism has been known that brings two terminals disposed in a body of the image forming apparatus into contact and separates the two terminals in response to a process unit attached and detached to and from the body in the image forming apparatus.

SUMMARY

An image forming apparatus according to an aspect of this disclosure includes an image-carrying member, a first terminal, a movable unit, a second terminal, a transfer member, a blocking member, and a latch mechanism. The image-carrying member carries a developer image. The first terminal outputs a transfer voltage. The movable unit is supported so as to be movable between a standard position close to the image-carrying member and the first terminal and a separated position farther from the image-carrying member and the first terminal than the standard position. The second terminal is supported by the movable unit, and comes into contact with the first terminal when the movable unit is located at the standard position and goes apart from the first terminal when the movable unit is located at the separated position. The transfer member is supported by the movable unit, is electrically connected to the second terminal, and transfers the developer image carried by the image-carrying member to a sheet passing between the transfer member and the image-carrying member when the movable unit is located at the standard position. The blocking member is movable between a blocking position at which an access path to the first terminal is blocked and an opening position at which the access path is opened. Following movement of the movable unit, the latch mechanism latches the blocking member at the blocking position when the movable unit is located at the separated position and unlatches the blocking member when the movable unit moves from the separated position to the standard position. When the movable unit moves from the separated position to the standard position, the second terminal moves to a position at which the second terminal comes into contact with the first terminal through the access path while moving the blocking member unlatched by the latch mechanism from the blocking position to the opening position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described with reference to the drawings. It is to be noted that the following embodiment is a specific example of this disclosure and does not limit the technical scope of this disclosure.

[Configuration of Image Forming Apparatus 10]

An image forming apparatus 10 according to the embodiment includes a printing device 4 that executes a print process in an electrophotographic manner. The print process is a process of forming an image on a sheet 9. The sheet 9 is an image forming medium such as a paper sheet or a sheet-shaped resin member.

Figure 1:
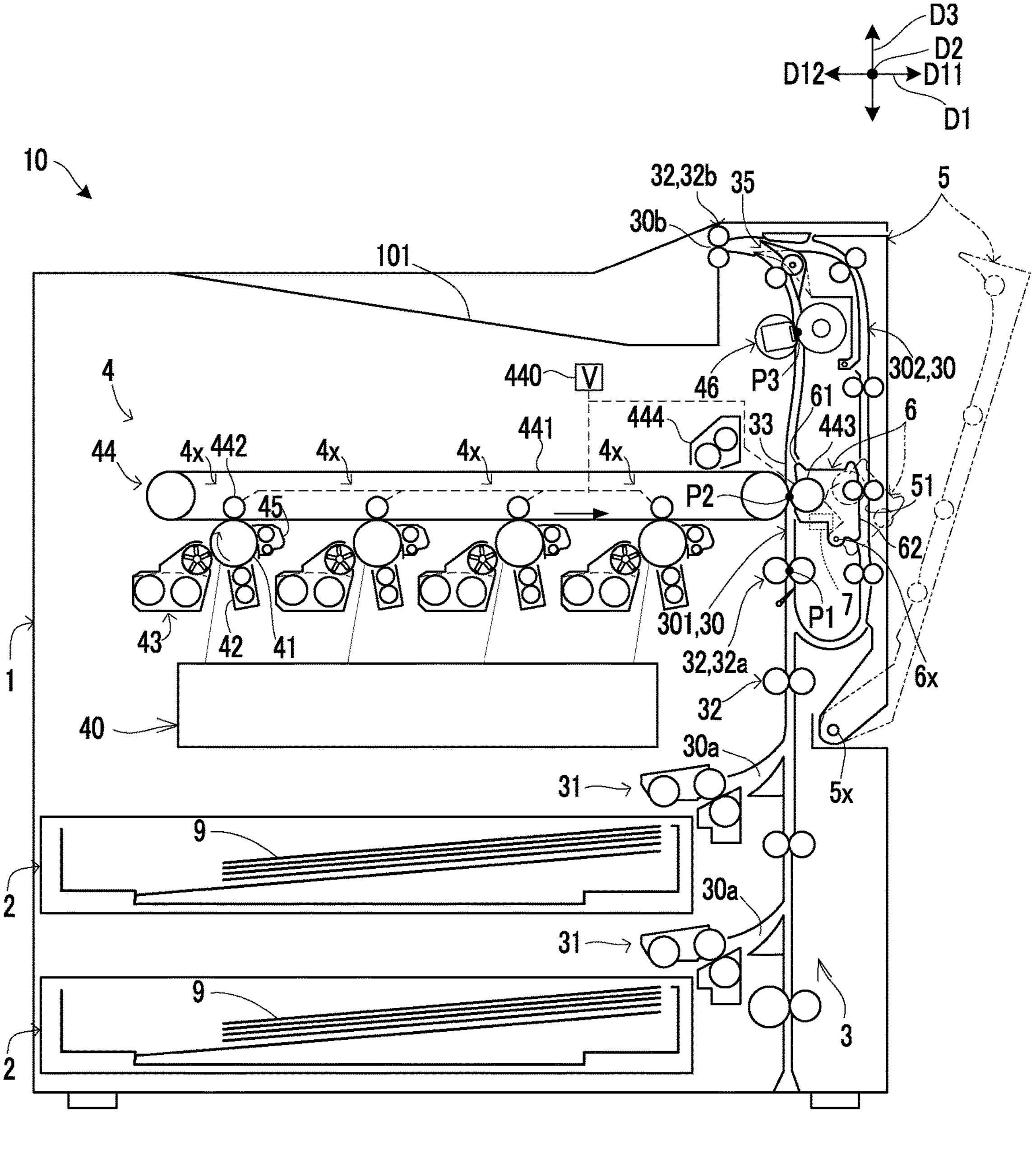
FIG. 1 is a configuration diagram of an image forming apparatus according to an embodiment.

As shown in FIG. 1, the image forming apparatus 10 includes a sheet conveying device 3 and the printing device 4 disposed in a body 1. The body 1 is a housing that houses the sheet conveying device 3, the printing device 4, and the like.

The printing device 4 includes one or more image forming portions 4*x*, a laser scanning unit 40, a transfer device 44, and a fixing device 46. The image forming portions 4*x* each include a drum-shaped photoconductor 41, a charging device 42, a developing device 43, a drum cleaning device 45, and the like.

The sheet conveying device 3 includes a sheet feeding device 31 and a plurality of conveying roller pairs 32. Furthermore, the sheet conveying device 3 includes unillustrated driving devices that drive the sheet feeding device 31 and the plurality of conveying roller pairs 32.

The sheet feeding device 31 feeds the sheet 9 stored in a sheet storing portion 2 to a sheet conveyance path 30 in the body 1. The sheet conveyance path 30 forms a path in which the sheet 9 is conveyed.

The plurality of conveying roller pairs 32 is each rotationally driven by the driving device. The plurality of conveying roller pairs 32 conveys the sheet 9 along the sheet conveyance path 30 by rotating with the sheet 9 nipped in between.

The sheet conveyance path 30 includes a main conveyance path 301 and a sub-conveyance path 302. The main conveyance path 301 is a path extending from an introduction port 30*a* to a discharge port 30*b* through a registration position P1, a transfer position P2, and a fixation position P3.

In this embodiment, the transfer position P2 is located on the upstream side of the registration position P1 and the fixation position P3 is located on the upstream side of the transfer position P2. In addition, the registration position P1 is located on the upstream side of the introduction port 30*a* and the discharge port 30*b* is located on the upstream side of the fixation position P3.

The sub-conveyance path 302 branches from the portion between the fixation position P3 and the discharge port 30*b* in the main conveyance path 301 and merges with the portion between the introduction port 30*a* and the registration position P1 in the main conveyance path 301.

The plurality of conveying roller pairs 32 includes a registration roller pair 32*a* and a discharge roller pair 32*b*.

The registration roller pair 32*a* temporarily stops the sheet 9 at the registration position P1 and then feeds the sheet 9 to the transfer position P2. The action of the registration roller pair 32*a* adjusts a timing at which the sheet 9 is fed to the transfer position P2.

The discharge roller pair 32*b* rotates in a first rotation direction to discharge the sheet 9 passing by the fixation position P3 from the discharge port 30*b* of the main conveyance path 301 onto a discharge tray 101.

The sheet conveying device 3 further includes a path switching mechanism 35. The path switching mechanism 35 is selectively switched to one of a first state and a second state.

In the first state, the path switching mechanism 35 provides communication to the path from the fixation position P3 in the main conveyance path 301 to the discharge port 30*b*. In addition, in the second state, the path switching mechanism 35 provides communication to the path from the discharge port 30*b* of the main conveyance path 301 to the sub-conveyance path 302.

When the path switching mechanism 35 is in the first state, the discharge roller pair 32*b* is rotationally driven in the first rotation direction. When the path switching mechanism 35 is in the second state, the discharge roller pair 32*b* rotates in a second rotation direction to reversely convey the sheet 9. This introduces the sheet 9 to the sub-conveyance path 302.

Some of the plurality of conveying roller pairs 32 convey the sheet 9 along the sub-conveyance path 302 and further feed the sheet 9 to the registration position P1 in the main conveyance path 301 again.

The printing device 4 forms a toner image on the sheet 9 conveyed by the sheet conveying device 3 along the main conveyance path 301. The toner image is a developer image in which toner is used as a developer. The toner is an example of the developer having a granular shape.

The image forming apparatus 10 shown in FIG. 1 is a tandem-type color-image forming apparatus. The printing device 4 therefore includes the plurality of image forming portions 4*x* corresponding to the toners of a plurality of colors. In this embodiment, the printing device 4 includes the four image forming portions 4*x* corresponding to the four colors of yellow, cyan, magenta, and black.

In each of the image forming portions 4*x*, the photoconductor 41 rotates and the charging device 42 charges a surface of the photoconductor 41. Furthermore, the laser scanning unit 40 writes an electrostatic latent image on the surface of the photoconductor 41 by scanning the surface of the photoconductor 41 with laser light.

Furthermore, the developing device 43 supplies the surface of the photoconductor 41 with the toner to develop the electrostatic latent image as the toner image.

The transfer device 44 transfers the toner image to the sheet 9 at the transfer position P2 in the sheet conveyance path 30. The transfer device 44 includes an intermediate transfer belt 441, four primary transfer rollers 442 corresponding to the four image forming portions 4*x*, a secondary transfer roller 443, and a belt cleaning device 444.

Furthermore, the transfer device 44 includes a voltage output device 440 that supplies the four primary transfer rollers 442 and the secondary transfer roller 443 with transfer voltages.

The primary transfer rollers 442 rotate following the rotation of the respective photoconductors 41. The secondary transfer roller 443 rotates following the rotation of the intermediate transfer belt 441.

In the transfer device 44, the primary transfer rollers 442 each transfer the toner image on the surface of the photoconductor 41 to a surface of the intermediate transfer belt 441. This forms the color toner image on the surface of the intermediate transfer belt 441.

The primary transfer rollers 442 each cause the toner image to transition from the surface of the photoconductor 41 to the surface of the intermediate transfer belt 441 by using an electric field caused by the transfer voltage.

The secondary transfer roller 443 transfers the toner image formed on the intermediate transfer belt 441 to the sheet 9 at the transfer position P2 in the main conveyance path 301. That is, the secondary transfer roller 443 transfers the toner image carried by the intermediate transfer belt 441 to the sheet 9 passing between the intermediate transfer belt 441 and the secondary transfer roller 443.

The secondary transfer roller 443 causes the toner image to transition from the surface of the intermediate transfer belt 441 to a surface of the sheet 9 by using an electric field caused by the transfer voltage.

Both the photoconductors 41 and the intermediate transfer belt 441 are examples of an image-carrying member that rotates while carrying the toner image. The secondary transfer roller 443 is an example of a transfer member that transfers the toner image carried by the intermediate transfer belt 441 to the sheet 9.

Additionally, in a case where the image forming apparatus 10 is a monochrome-image forming apparatus, the secondary transfer roller 443 transfers the toner image on the photoconductor 41 to the sheet 9 at the transfer position P2.

The drum cleaning devices 45 each remove waste toner remaining on the surface of the photoconductor 41. The belt cleaning device 444 removes waste toner remaining on the intermediate transfer belt 441.

The fixing device 46 heats and pressurizes the toner image on the sheet 9 at the fixation position P3 in the main conveyance path 301 while conveying the sheet 9. Thus, the fixing device 46 fixes the toner image onto the sheet 9.

Incidentally, the secondary transfer roller 443 is supported by a movable unit 6 in some cases. It is possible to separate the movable unit 6 from the intermediate transfer belt 441 and bring the movable unit 6 into contact with the intermediate transfer belt 441. The movable unit 6 is moved to a position apart from the intermediate transfer belt 441 to open the sheet conveyance path between the intermediate transfer belt 441 and the secondary transfer roller 443.

It is important to provide an electric shock preventing mechanism 7 that prevents a user from touching an output terminal of the transfer voltage when the movable unit 6 is apart from the intermediate transfer belt 441. In addition, it is desirable to achieve the electric shock preventing mechanism 7 in a simple configuration.

The image forming apparatus 10 includes an outer cover 5 that closes an opening formed on the body 1, the movable unit 6 provided inside the outer cover 5, and the electric shock preventing mechanism 7. The secondary transfer roller 443 is supported by the movable unit 6 so as to be rotatable.

In the following description, the direction from the outer cover 5 or the movable unit 6 to the outside of the body 1 will be referred to as an outward direction D11. In addition, the direction opposite to the outward direction D11 will be referred to as an inward direction D12. In addition, the direction along the outward direction D11 and the inward direction D12 will be referred to as a depth direction D1.

In each of the diagrams, a width direction D2 is a horizontal direction crossing the depth direction D1. In addition, a vertical direction D3 is a direction crossing the depth direction D1 and the width direction D2. The vertical direction D3 is an up-down direction.

Figure 4:
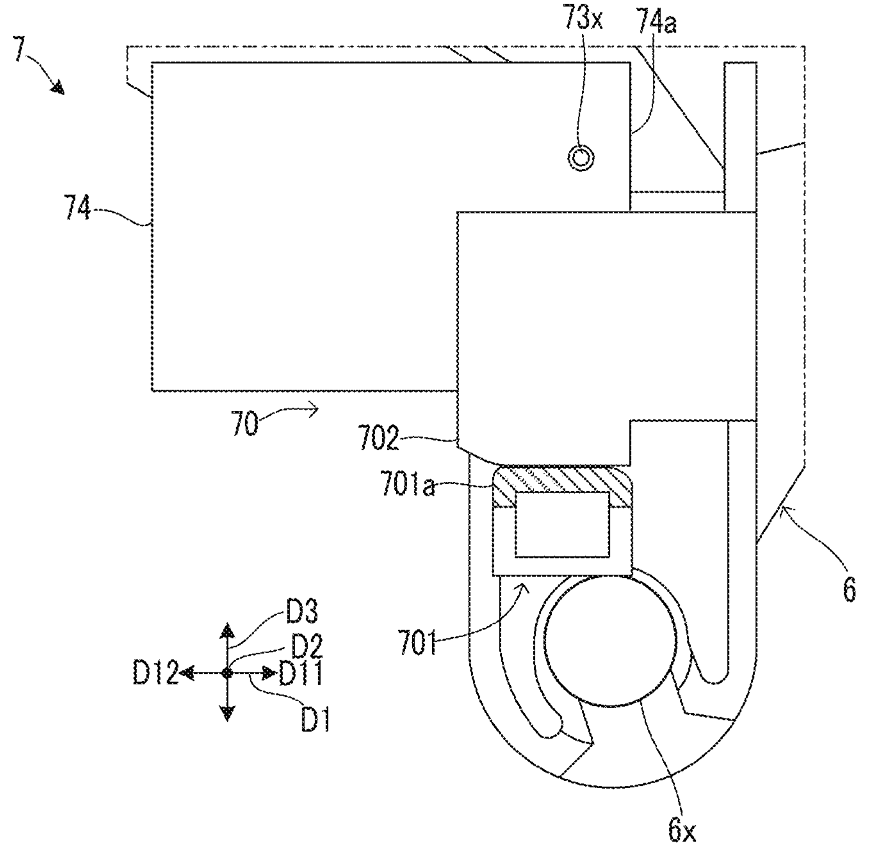
FIG. 4 is a side view including a partial cross section of the electric shock preventing mechanism in the connected state in the image forming apparatus according to the embodiment.
Figure 5:
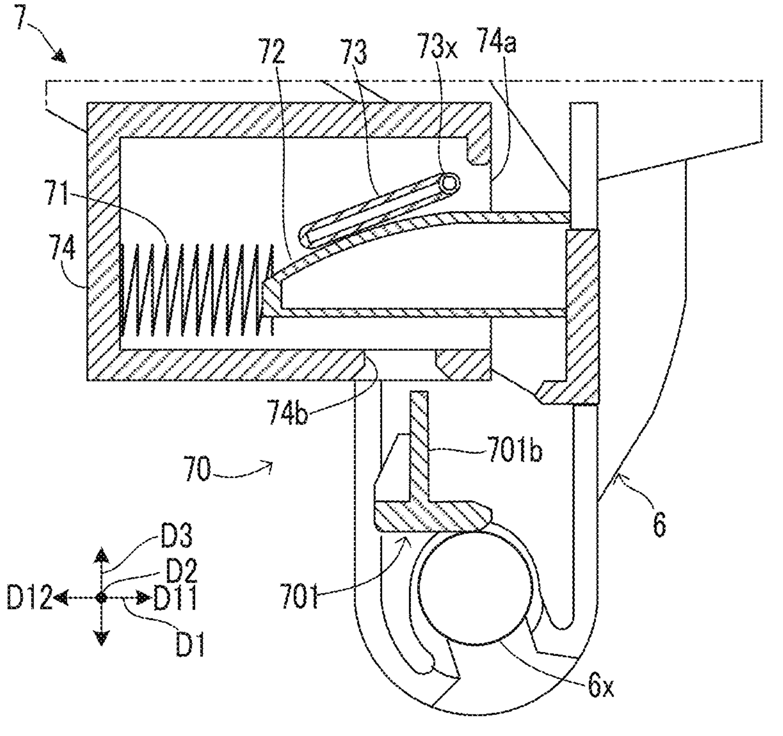
FIG. 5 is a first diagram of the electric shock preventing mechanism in the connected state in the image forming apparatus according to the embodiment.
Figure 6:
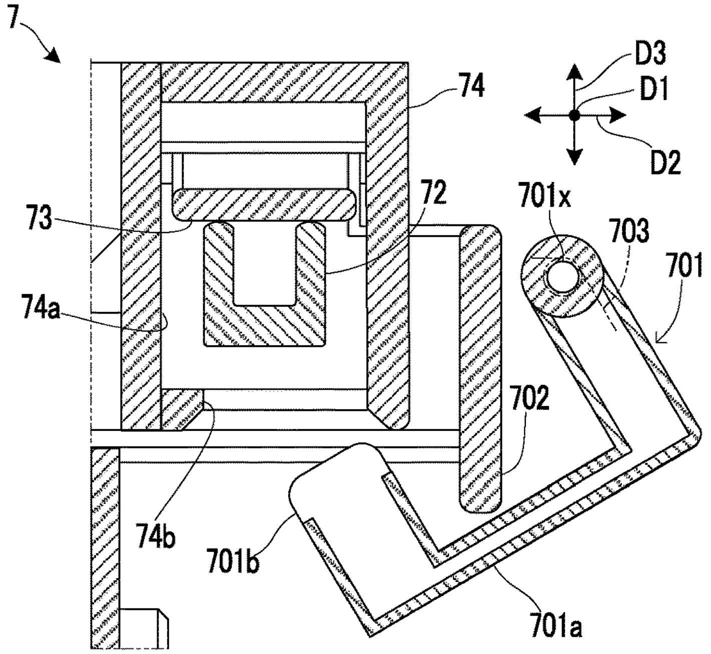
FIG. 6 is a second diagram of the electric shock preventing mechanism in the connected state in the image forming apparatus according to the embodiment.
Figure 10:
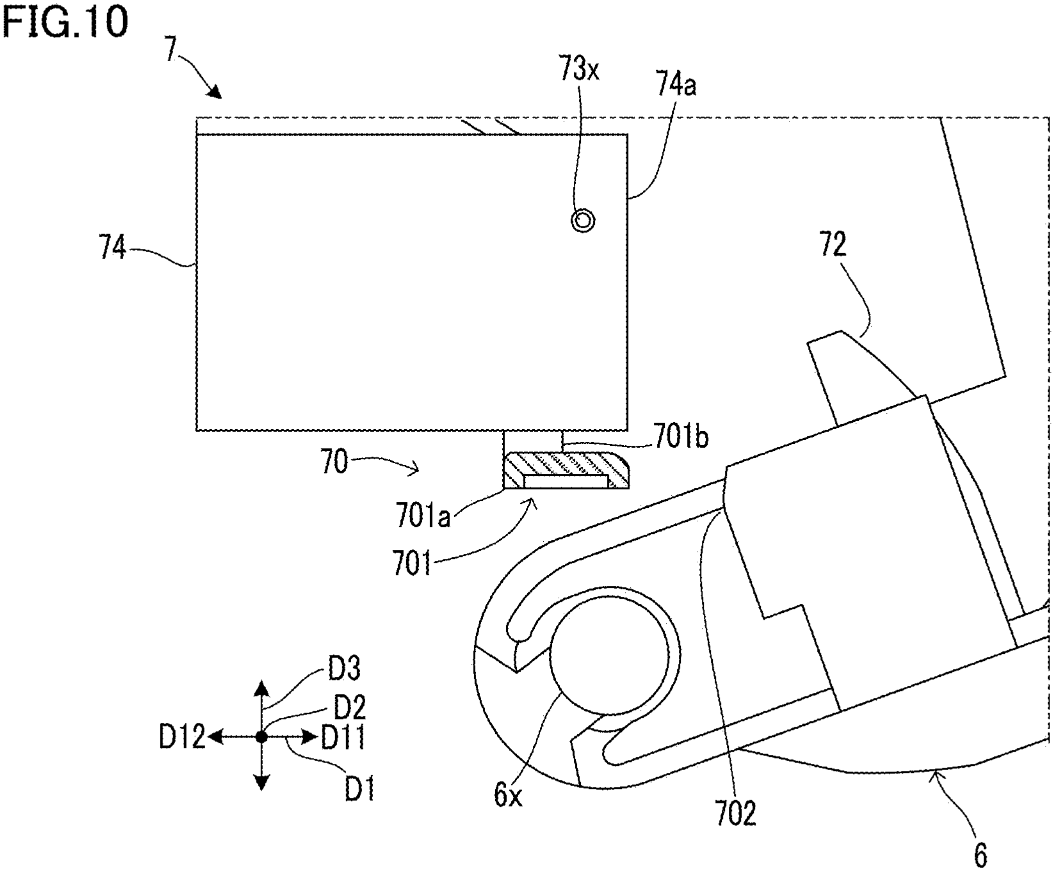
FIG. 10 is a side view including a partial cross section of the electric shock preventing mechanism in the opening state in the image forming apparatus according to the embodiment.
Figure 11:
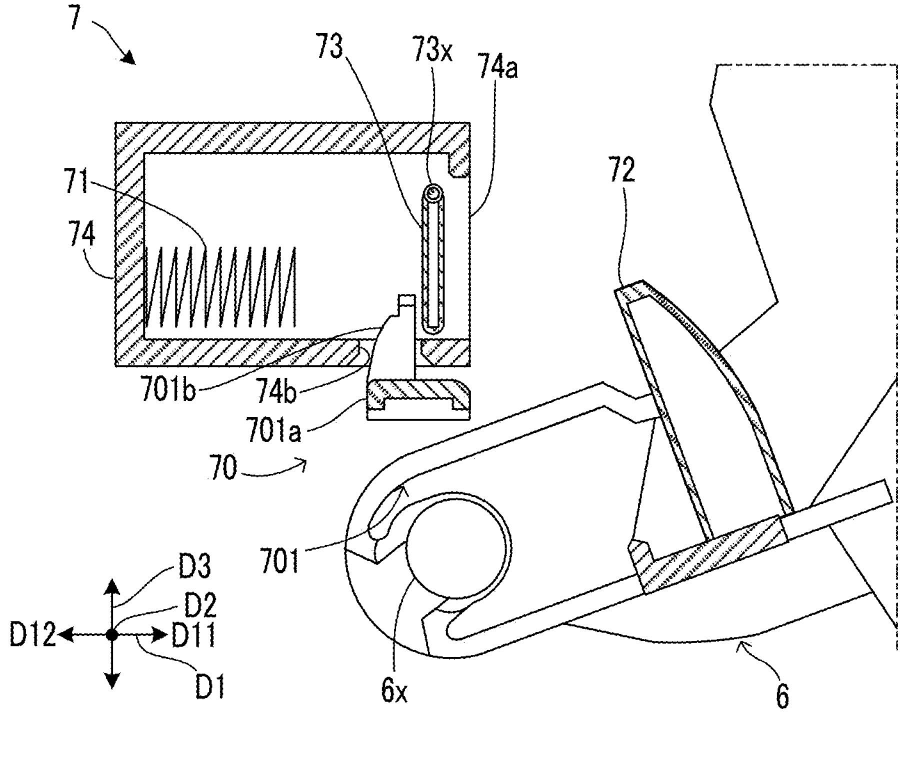
FIG. 11 is a first diagram of the electric shock preventing mechanism in the opening state in the image forming apparatus according to the embodiment.
Figure 12:
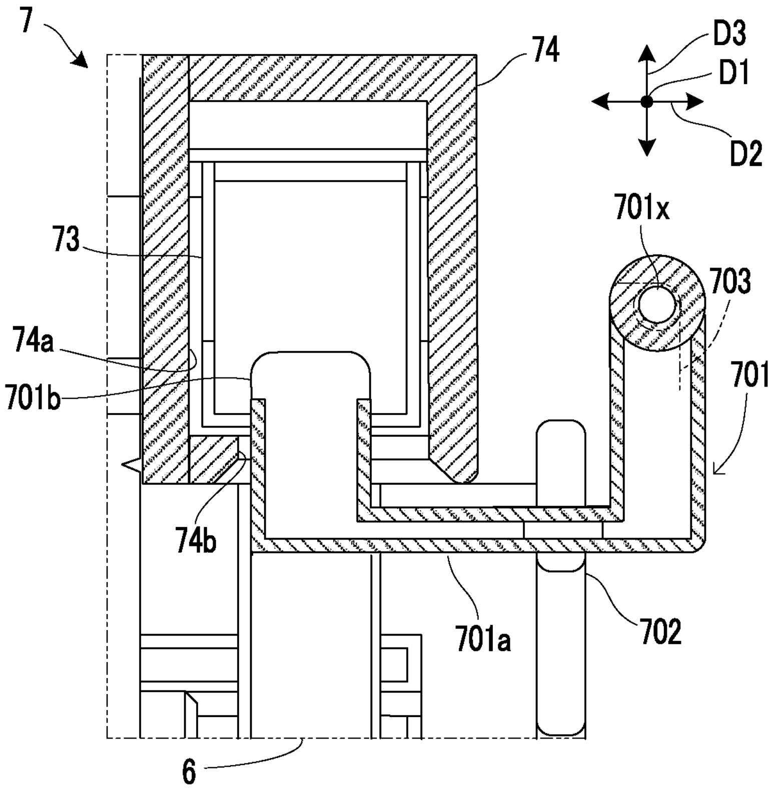
FIG. 12 is a second diagram of the electric shock preventing mechanism in the opening state in the image forming apparatus according to the embodiment.

Each of FIGS. 4, 5, 7, 8, 10, and 11 is a view of the electric shock preventing mechanism 7 taken along the width direction D2. Each of FIGS. 6, 9, and 12 is a view of the electric shock preventing mechanism 7 taken from the inside in the depth direction D1.

The four photoconductors 41, the four primary transfer rollers 442, and the secondary transfer roller 443 each rotate around a rotation axis along the width direction D2.

The outer cover 5 is supported by the body 1 so as to be pivotable. The outer cover 5 is pivotable around a first supporting shaft 5*x* supported by the body 1. The outer cover 5 is pivotable in the outward direction D11 from a closed position at which the movable unit 6 is covered.

The outer cover 5 is movable between the closed position and an open position at which the movable unit 6 is exposed. FIG. 1 shows the outer cover 5 located at the closed position by a solid line and the outer cover 5 located at the open position by a two-dot chain line.

The movable unit 6 supports the secondary transfer roller 443 such that the secondary transfer roller 443 is rotatable. The movable unit 6 is supported so as to be pivotable around a second supporting shaft 6*x* supported by the body 1.

Figure 2:
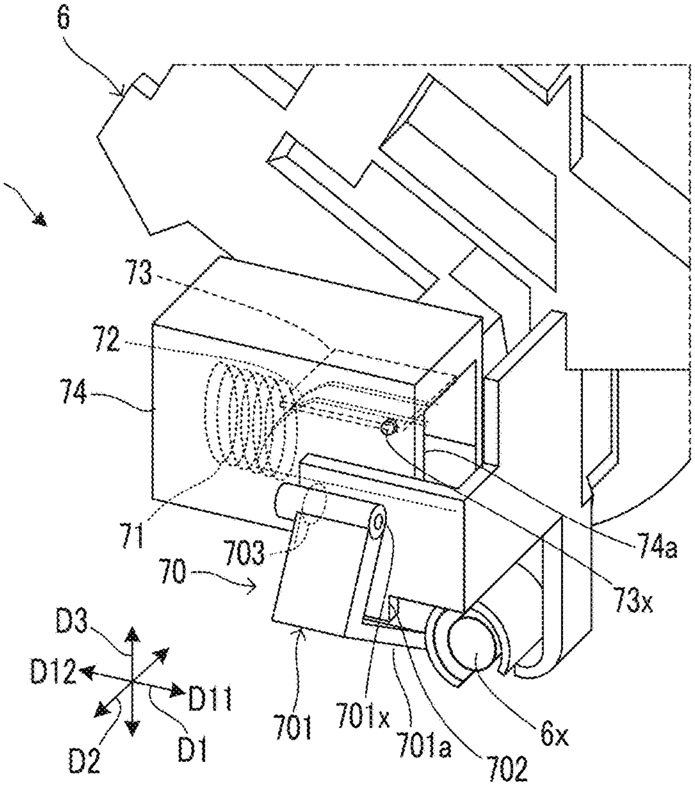
FIG. 2 is a perspective view of an electric shock preventing mechanism in a connected state in the image forming apparatus according to the embodiment.
Figure 3:
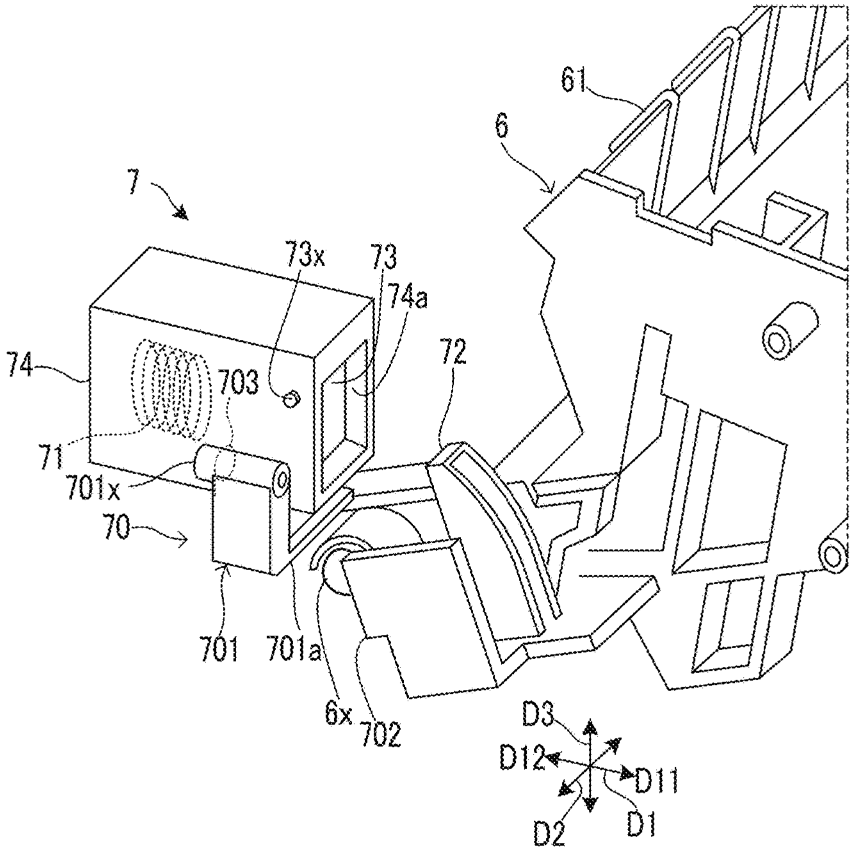
FIG. 3 is a perspective view of the electric shock preventing mechanism in an opening state in the image forming apparatus according to the embodiment.

The electric shock preventing mechanism 7 includes a first terminal 71, a second terminal 72, a blocking member 73, and a latch mechanism 70 (see FIGS. 2 and 3). Both the first terminal 71 and the second terminal 72 are electrically conductive members. In this embodiment, the first terminal 71 and the second terminal 72 are metal members.

The first terminal 71 is electrically connected to the voltage output device 440 and outputs the transfer voltage. The movable unit 6 is supported by the second supporting shaft 6*x* so as to be movable between a standard position and a separated position.

FIG. 1 shows the movable unit 6 located at the standard position by a solid line and the movable unit 6 located at the separated position by a two-dot chain line. In addition, the movable unit 6 shown in FIG. 2 is located at the standard position. The movable unit 6 shown in FIG. 3 is located at the separated position.

The intermediate transfer belt 441 is supported at a predefined position in the body 1 so as to be rotatable. The first terminal 71 is fixed at a predefined position in the body 1.

The standard position is a position close to the intermediate transfer belt 441 and the first terminal 71. The separated position is a position farther from the intermediate transfer belt 441 and the first terminal 71 than the standard position.

When the outer cover 5 is located at the open position, the movable unit 6 is movable between the standard position and the separated position.

The sheet conveying device 3 includes a first main conveyance guide 33, a second main conveyance guide 61, a first sub-conveyance guide 62, and a second sub-conveyance guide 51 that each guide the conveyance of the sheet 9 (see FIG. 1).

The first main conveyance guide 33 is disposed next to the intermediate transfer belt 441. The second main conveyance guide 61 and the first sub-conveyance guide 62 are supported by the movable unit 6. The second sub-conveyance guide 51 is supported by the outer cover 5.

When the movable unit 6 is located at the standard position, the second main conveyance guide 61 forms part of the main conveyance path 301 between the second main conveyance guide 61 and the first main conveyance guide 33. When the movable unit 6 is located at the separated position, the second main conveyance guide 61 goes apart from the first main conveyance guide 33 to open the part of the main conveyance path 301.

The first main conveyance guide 33 and the second main conveyance guide 61 are examples of a first conveyance guide and a second conveyance guide, respectively.

When the movable unit 6 is located at the standard position and the outer cover 5 is located at the closed position, the second sub-conveyance guide 51 forms part of the sub-conveyance path 302 between the second sub-conveyance guide 51 and the first sub-conveyance guide 62. When the outer cover 5 is located at the open position, the sub-conveyance path 302 is opened.

The electric shock preventing mechanism 7 is a mechanism that prevents an electric shock caused by contact with the first terminal 71 when the movable unit 6 is located at the separated position. The first terminal 71 is an output terminal of the transfer voltage.

The second terminal 72 is supported by the movable unit 6. When the movable unit 6 is located at the standard position, the second terminal 72 comes into contact with the first terminal 71 (see FIGS. 2 and 5). In contrast, when the movable unit 6 is located at the separated position, the second terminal 72 goes apart from the first terminal 71 (see FIGS. 3 and 11).

The secondary transfer roller 443 is electrically connected to the second terminal 72. When the movable unit 6 is located at the standard position, the secondary transfer roller 443 transfers the toner image to the sheet 9 passing between the secondary transfer roller 443 and the intermediate transfer belt 441.

The blocking member 73 is movable between a blocking position at which an access path to the first terminal 71 is blocked and an opening position at which the access path is opened. Each of FIGS. 3, 11, and 12 shows that the blocking member 73 is located at the blocking position. Each of FIGS. 2, 5, and 6 shows that the blocking member 73 is located at the opening position.

Specifically, the blocking member 73 is supported by a third supporting shaft 73*x* disposed at a predefined position in the body 1 so as to be pivotable. The position of the blocking member 73 at which the blocking member 73 hangs down from the third supporting shaft 73*x* is the blocking position (see FIGS. 3, 11, and 12). In contrast, the position of the blocking member 73 at which the blocking member 73 is lifted up in the inward direction D12 with respect to the blocking position is the opening position (see FIGS. 2, 5, and 6).

The latch mechanism 70 is a mechanism that follows the movement of the movable unit 6. The latch mechanism 70 latches the blocking member 73 at the blocking position when the movable unit 6 is located at the separated position (see FIG. 11). In contrast, the latch mechanism 70 unlatches the blocking member 73 when the movable unit 6 moves from the separated position to the standard position (see FIG. 5).

Specifically, the latch mechanism 70 includes a swing member 701, a contact member 702, and a spring 703 (see FIGS. 2 and 3). The swing member 701 is supported by a fourth supporting shaft 701*x* disposed at a predefined position in the body 1 so as to be swingable. The contact member 702 is supported by the movable unit 6.

The swing member 701 includes an arm portion 701*a* and a latch portion 701*b* (see FIGS. 6, 9, and 12).

The arm portion 701*a* is formed to extend below the blocking member 73 from the portion supported by the fourth supporting shaft 701*x*. The latch portion 701*b* is continuous to the arm portion 701*a*.

The swing member 701 is swingable between a latch position and an unlatch position. When the swing member 701 is located at the latch position, the latch portion 701*b* latches the blocking member 73. FIG. 6 shows that the swing member 701 is located at the latch position.

When the swing member 701 is located at the unlatch position, the blocking member 73 latched by the latch portion 701*b* is unlatched. Each of FIGS. 9 and 12 shows that the swing member 701 is located at the unlatch position.

The spring 703 elastically biases the swing member 701 to hold the latch portion 701*b* at the latch position. In this embodiment, the spring 703 is a torsion coil spring supported by the fourth supporting shaft 701*x*. The spring 703 is an example of an elastic member.

It is to be noted that the swing member 701 may be configured to swing from the unlatch position to the latch position by the weight of the swing member 701. In this case, it is possible to omit the spring 703.

When the movable unit 6 moves from the separated position to the standard position, the contact member 702 comes into contact with the arm portion 701*a* and moves the swing member 701 from the latch position to the unlatch position against the biasing force of the spring 703.

In contrast, when the movable unit 6 moves from the standard position to the separated position, the contact member 702 is separated from the arm portion 701*a*. This moves the swing member 701 from the unlatch position to the latch position by the biasing force of the spring 703.

Each of FIGS. 4 to 6 shows the electric shock preventing mechanism 7 in a connected state. The connected state is a state in which the second terminal 72 is in contact with the first terminal 71. In the connected state, the second terminal 72 supports the blocking member 73 from below and holds the blocking member 73 at the opening position. When the movable unit 6 is located at the standard position and the swing member 701 is located at the latch position, the electric shock preventing mechanism 7 is in the connected state.

Each of FIGS. 10 to 12 shows the electric shock preventing mechanism 7 in an opening state. The opening state is a state in which the second terminal 72 is separated from the first terminal 71 and the blocking member 73. When the movable unit 6 is located at the separated position and the swing member 701 is located at the unlatch position, the electric shock preventing mechanism 7 is in the opening state.

Figure 7:
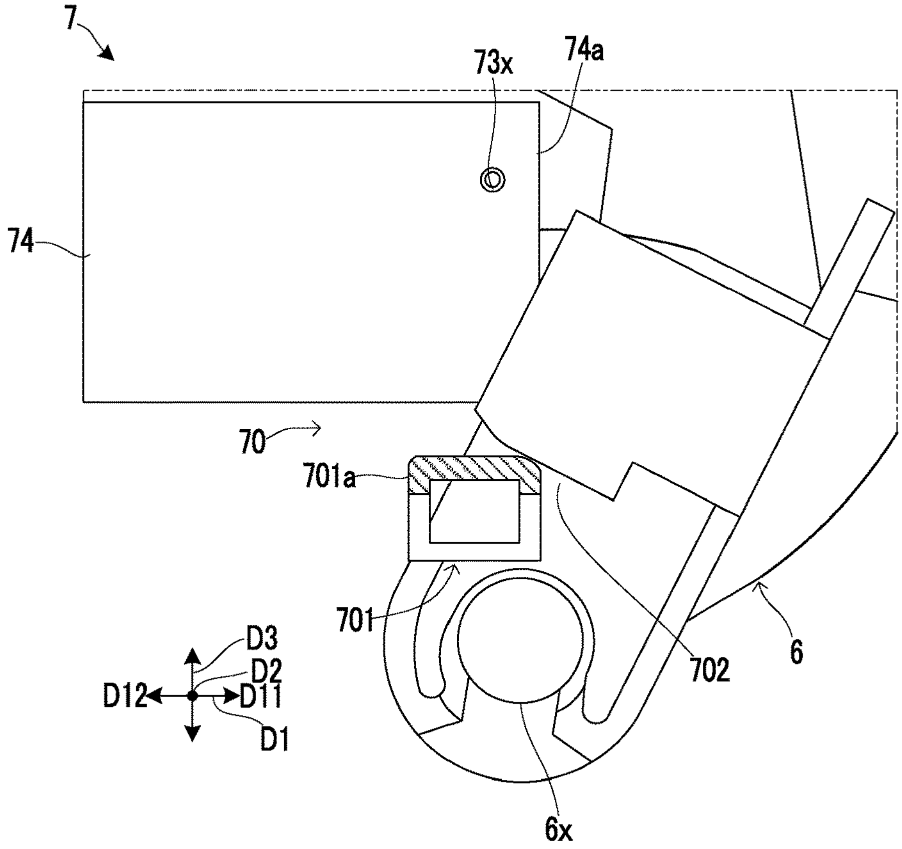
FIG. 7 is a side view including a partial cross section of the electric shock preventing mechanism in an intermediate state in the image forming apparatus according to the embodiment.
Figure 8:
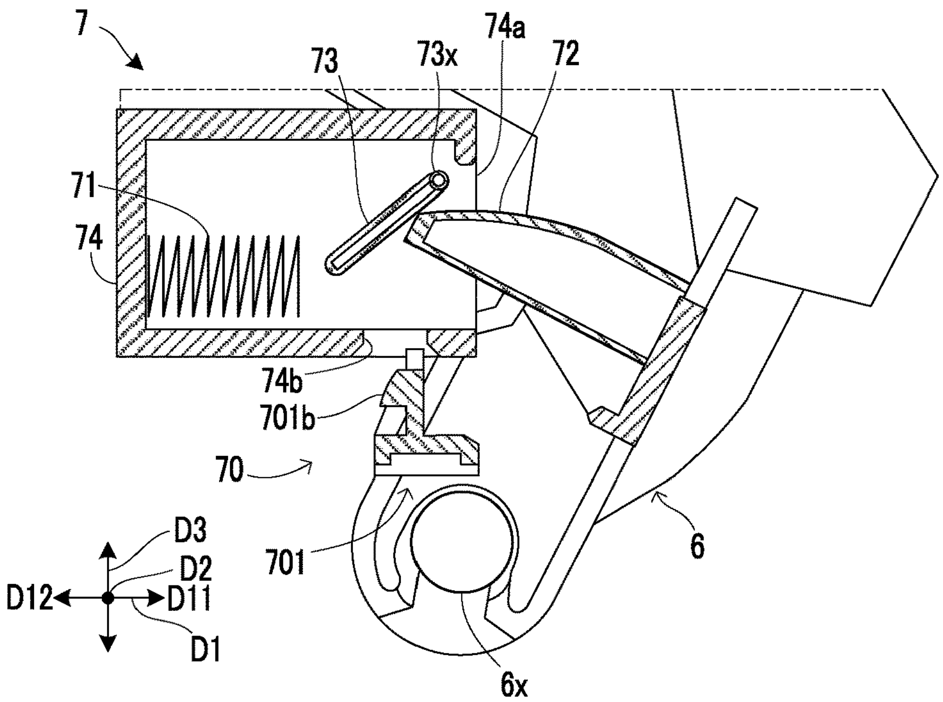
FIG. 8 is a first diagram of the electric shock preventing mechanism in the intermediate state in the image forming apparatus according to the embodiment.
Figure 9:
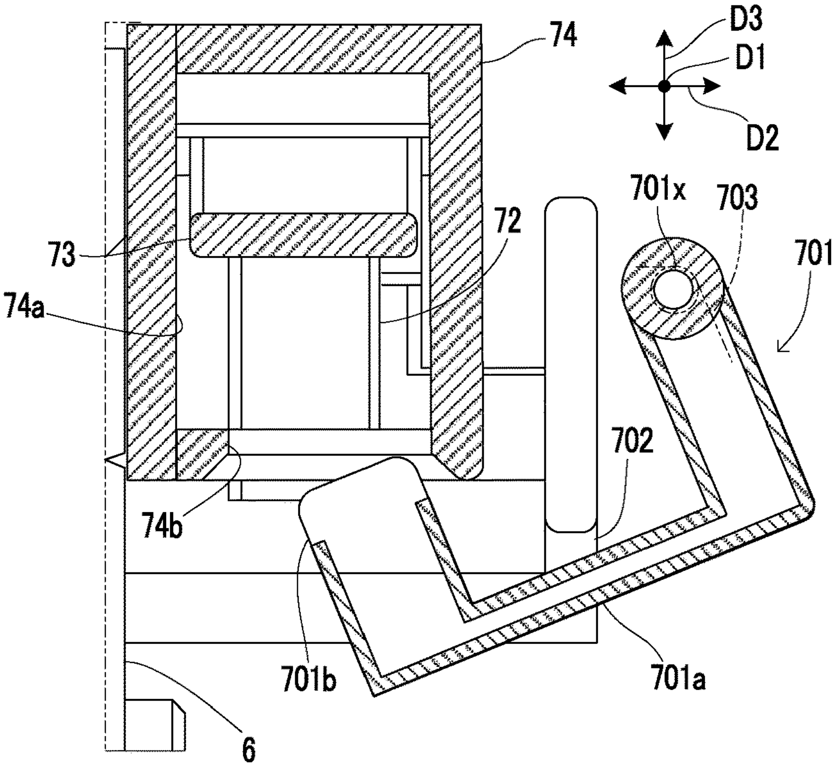
FIG. 9 is a second diagram of the electric shock preventing mechanism in the intermediate state in the image forming apparatus according to the embodiment.

Each of FIGS. 7 to 9 shows the electric shock preventing mechanism 7 in an intermediate state. The intermediate state is a state between the connected state and the opening state.

When the movable unit 6 moves from the separated position to the standard position, the second terminal 72 moves to a position at which the second terminal 72 comes into contact with the first terminal 71 through the access path while moving the blocking member 73 unlatched by the latch mechanism 70 from the blocking position to the opening position (see FIGS. 4 to 6).

In contrast, when the movable unit 6 moves from the standard position to the separated position, the second terminal 72 moves in the outward direction D11 from a position at which the second terminal 72 comes into contact with the first terminal 71 and the blocking member 73 (see FIGS. 7 to 12). This moves the blocking member 73 from the opening position to the blocking position by the weight of the blocking member 73 and the latch mechanism 70 latches the blocking member 73 at the blocking position.

It is to be noted that the electric shock preventing mechanism 7 may include an elastic member such as a spring which elastically biases the blocking member 73 toward the blocking position.

The electric shock preventing mechanism 7 includes a terminal box 74 that includes the first terminal 71 (see FIGS. 2 to 12). The terminal box 74 is disposed at a predefined position in the body 1. The terminal box 74 has an access opening 74*a* in which the access path is formed. The access opening 74*a* opens the inside of the terminal box 74 in the outward direction D11.

The blocking member 73 closes the access opening 74*a* at the blocking position (see FIGS. 3 and 11). In contrast, the blocking member 73 opens the access opening 74*a* at the opening position (see FIGS. 2 and 5).

For example, the first terminal 71 is a spring that is elastically deformable by force received from the second terminal 72. In each of the examples shown in FIGS. 1 to 12, the first terminal 71 is a coil spring. This reliably holds the first terminal 71 and the second terminal 72 in contact when the movable unit 6 is located at the standard position. It is to be noted that the first terminal 71 may be a leaf spring.

The terminal box 74 further has a lower opening 74*b* formed on the bottom surface of the terminal box 74 (see FIGS. 5, 6, 8, 9, 11, and 12). When the swing member 701 moves from the unlatch position to the latch position, the latch portion 701*b* enters a position along the blocking member 73 in the terminal box 74 through the lower opening 74*b* (see FIGS. 11 and 12).

That is, when the swing member 701 is located at the latch position, the latch portion 701*b* is disposed at the position along the blocking member 73 in the terminal box 74. Thus, the latch portion 701*b* latches the blocking member 73 at the blocking position.

As described above, the electric shock preventing mechanism 7 prevents an electric shock caused by contact with the first terminal 71 when the movable unit 6 is located at the separated position. In addition, the electric shock preventing mechanism 7 is achieved in a simple configuration. For example, the electric shock preventing mechanism 7 is achieved in a simpler configuration than the configuration of a mechanism that disconnects a power supply line from the voltage output device 440 to the first terminal 71 in response to the movement of the movable unit 6.

Supplementary Notes of Invention

The gist of the invention extracted from the embodiment described above will be supplementarily noted below. It is to be noted that the respective configurations and the respective processing functions described in the following supplementary notes can be sorted out and used in any combination.

Supplementary Note 1

An image forming apparatus including:

an image-carrying member configured to carry a developer image;

a first terminal configured to output a transfer voltage;

a movable unit supported so as to be movable between a standard position close to the image-carrying member and the first terminal and a separated position farther from the image-carrying member and the first terminal than the standard position;

a second terminal supported by the movable unit and configured to come into contact with the first terminal when the movable unit is located at the standard position and go apart from the first terminal when the movable unit is located at the separated position;

a transfer member supported by the movable unit, electrically connected to the second terminal, and configured to transfer the developer image carried by the image-carrying member to a sheet passing between the transfer member and the image-carrying member when the movable unit is located at the standard position;

a blocking member movable between a blocking position at which an access path to the first terminal is blocked and an opening position at which the access path is opened; and a latch mechanism configured to, following movement of the movable unit, latch the blocking member at the blocking position when the movable unit is located at the separated position and unlatch the blocking member when the movable unit moves from the separated position to the standard position, in which when the movable unit moves from the separated position to the standard position, the second terminal moves to a position at which the second terminal comes into contact with the first terminal through the access path while moving the blocking member unlatched by the latch mechanism from the blocking position to the opening position.

Supplementary Note 2

The image forming apparatus according to Supplementary Note 1, including a terminal box including the first terminal and having an access opening in which the access path is formed, in which the blocking member closes the access opening at the blocking position and opens the access opening at the opening position.

Supplementary Note 3

The image forming apparatus according to Supplementary Note 1 or 2, in which the first terminal is a spring that is elastically deformable by force received from the second terminal.

<Supplementary Note 4

The image forming apparatus according to any one of Supplementary Notes 1 to 3, including:

a first conveyance guide disposed next to the image-carrying member and configured to guide conveyance of the sheet; and second conveyance guide supported by the movable unit and configured to form part of a sheet conveyance path between the second conveyance guide and the first conveyance guide when the movable unit is located at the standard position.

Supplementary Note 5

The image forming apparatus according to any one of Supplementary Notes 1 to 4, in which the blocking member moves from the opening position to the blocking position by weight of the blocking member.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

an image-carrying member configured to carry a developer image;

a first terminal configured to output a transfer voltage;

a movable unit supported so as to be movable between a standard position close to the image-carrying member and the first terminal and a separated position farther from the image-carrying member and the first terminal than the standard position;

a second terminal supported by the movable unit and configured to come into contact with the first terminal when the movable unit is located at the standard position and go apart from the first terminal when the movable unit is located at the separated position;

a transfer member supported by the movable unit, electrically connected to the second terminal, and configured to transfer the developer image carried by the image-carrying member to a sheet passing between the transfer member and the image-carrying member when the movable unit is located at the standard position;

a blocking member movable between a blocking position at which an access path to the first terminal is blocked and an opening position at which the access path is opened; and a latch mechanism configured to, following movement of the movable unit, latch the blocking member at the blocking position when the movable unit is located at the separated position and unlatch the blocking member when the movable unit moves from the separated position to the standard position, wherein when the movable unit moves from the separated position to the standard position, the second terminal moves to a position at which the second terminal comes into contact with the first terminal through the access path while moving the blocking member unlatched by the latch mechanism from the blocking position to the opening position.

2. The image forming apparatus according to claim 1, comprising a terminal box including the first terminal and having an access opening in which the access path is formed, wherein the blocking member closes the access opening at the blocking position and opens the access opening at the opening position.

3. The image forming apparatus according to claim 1, wherein the first terminal is a spring that is elastically deformable by force received from the second terminal.

4. The image forming apparatus according to claim 1, comprising:

a first conveyance guide disposed next to the image-carrying member and configured to guide conveyance of the sheet; and a second conveyance guide supported by the movable unit and configured to form part of a sheet conveyance path between the second conveyance guide and the first conveyance guide when the movable unit is located at the standard position.

5. The image forming apparatus according to claim 1, wherein the blocking member moves from the opening position to the blocking position by weight of the blocking member.

* * * * *